Nov. 9, 1943.    R. G. PIETY    2,333,883
WELL SURVEYING DEVICE
Filed May 31, 1939    3 Sheets-Sheet 1

INVENTOR
R.G. PIETY
BY Hudson, Young, Shanley & Finger
ATTORNEYS

Patented Nov. 9, 1943

2,333,883

UNITED STATES PATENT OFFICE 2,333,883

WELL SURVEYING DEVICE

Raymond G. Piety, Bartlesville, Okla., assignor to Phillips Petroleum Company, a corporation of Delaware Application May 31, 1939, Serial No. 276,740

2 Claims. (Cl. 175—182)

This invention relates to improvements in apparatus and method for determining the nature of geological structure by electrical means.

In drilling for oil it is desirable to obtain information which will identify the geological strata being penetrated by the drill hole. It is customary when using a rotary drill to take samples of cuttings during the drilling operation. Such samples are easily obtained, but often do not provide enough information concerning the nature of the structure. Another method has been to take "cores" or cylindrical samples, cut from the rock during the drilling operations. This method gives good results but is time consuming and expensive.

Certain physical properties of subsurface strata are detectable by electrical means and form a basis for exploration of drill holes. The most important property involved is the electrical resistivity of the subsurface layers which show wide variations due to differences in quantity and quality of the fluid content of the formations. Variations in dielectric constant are less pronounced, but are great enough to be useful for exploration purposes. The electrical potential generated at the interface between the drill hole and porous formations which it penetrates, due to either differences in electrolytic concentration between the drilling fluid and the formation fluids or to passage of fluid into or out of the rock pores (electrofiltration), also furnishes useful information.

Methods of determining conductivity and admittance which have been proposed make use of localized electrodes and measure effects at these electrodes. These methods are limited to a small region near the bore hole for their effects. The present invention uses a large electrode and considerably extends the region influencing the flow of current.

The object of this invention is to obtain data electrically in bore holes.

Other objects and advantages will be apparent from the specification and from the accompanying drawings.

Figure 1:
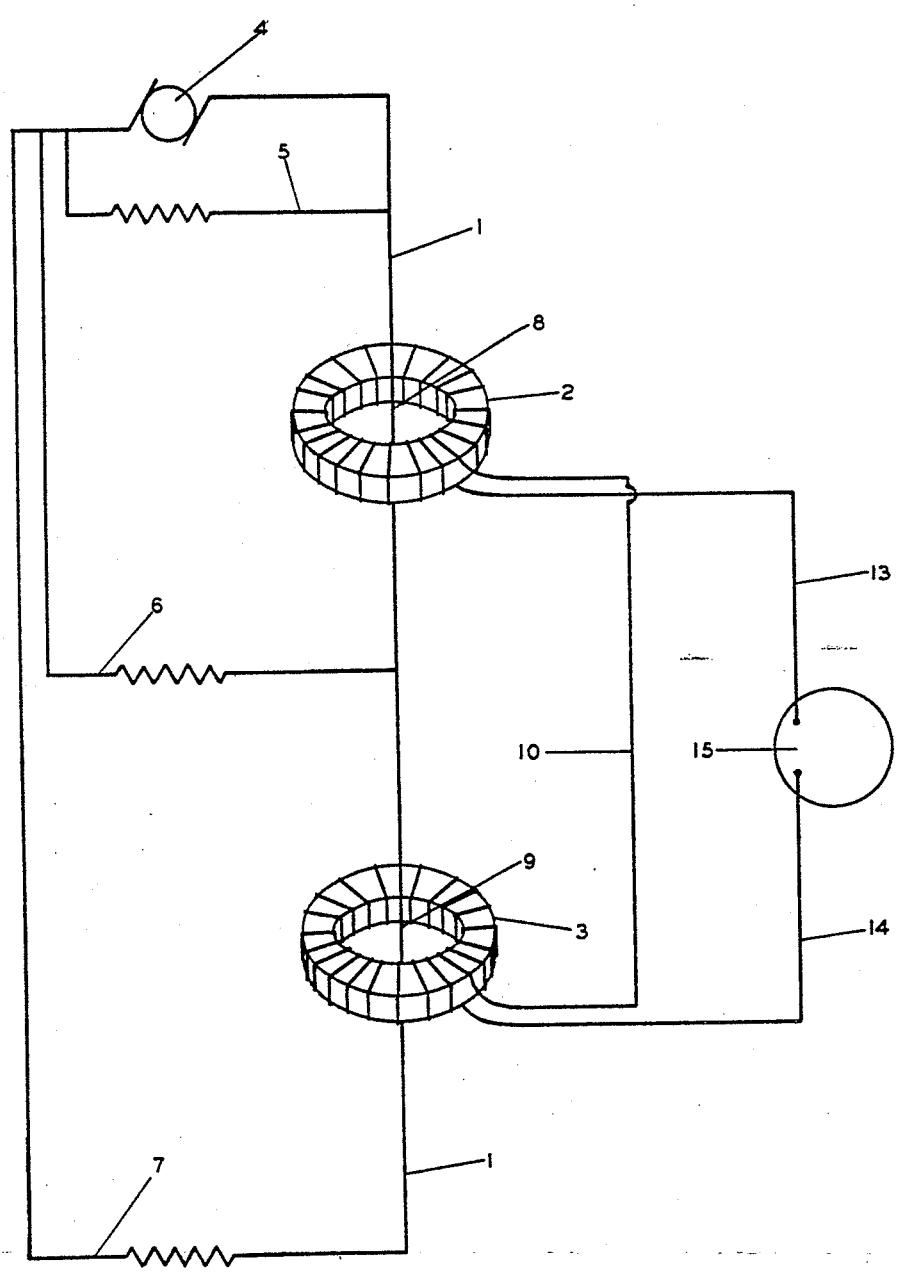
Figure 1 is a diagrammatic sketch illustrating the physical principles involved in this invention.

Referring to Figure 1, the numeral 1 refers to a wire or conductor in an electrical circuit comprising the conductor 1, a source of alternating current 4; and conductors 5, 6, and 7, having different resistances. A toroidal coil 2 surrounding the conductor 1 at the point 8 on this conductor will have induced in it a voltage which is proportional to the magnitude of the current passing through the conductor 1 at the point 8. This is merely the principle of a transformer with a single turn primary and a multiple turn secondary winding. A toroidal coil 3 placed in a similar position at the point 9 will likewise have a voltage induced in it which will be proportional to the current passing through the conductor 1 at the point 9. If the constants of toroidal coils 2 and 3 are equal, then by connecting the toroidal coils by a conductor 10 so the voltages will be opposing, the electromotive force between the leads 13 and 14 will be proportional to the difference in the currents passing the points 8 and 9, and may be measured by a suitable meter 15. Since the difference in the currents passing the point 8 and the point 9 will be equal to the current entering the conductor 1 through conductor 6, this furnishes an indirect method of measuring the current in conductor 6.

Figure 2:
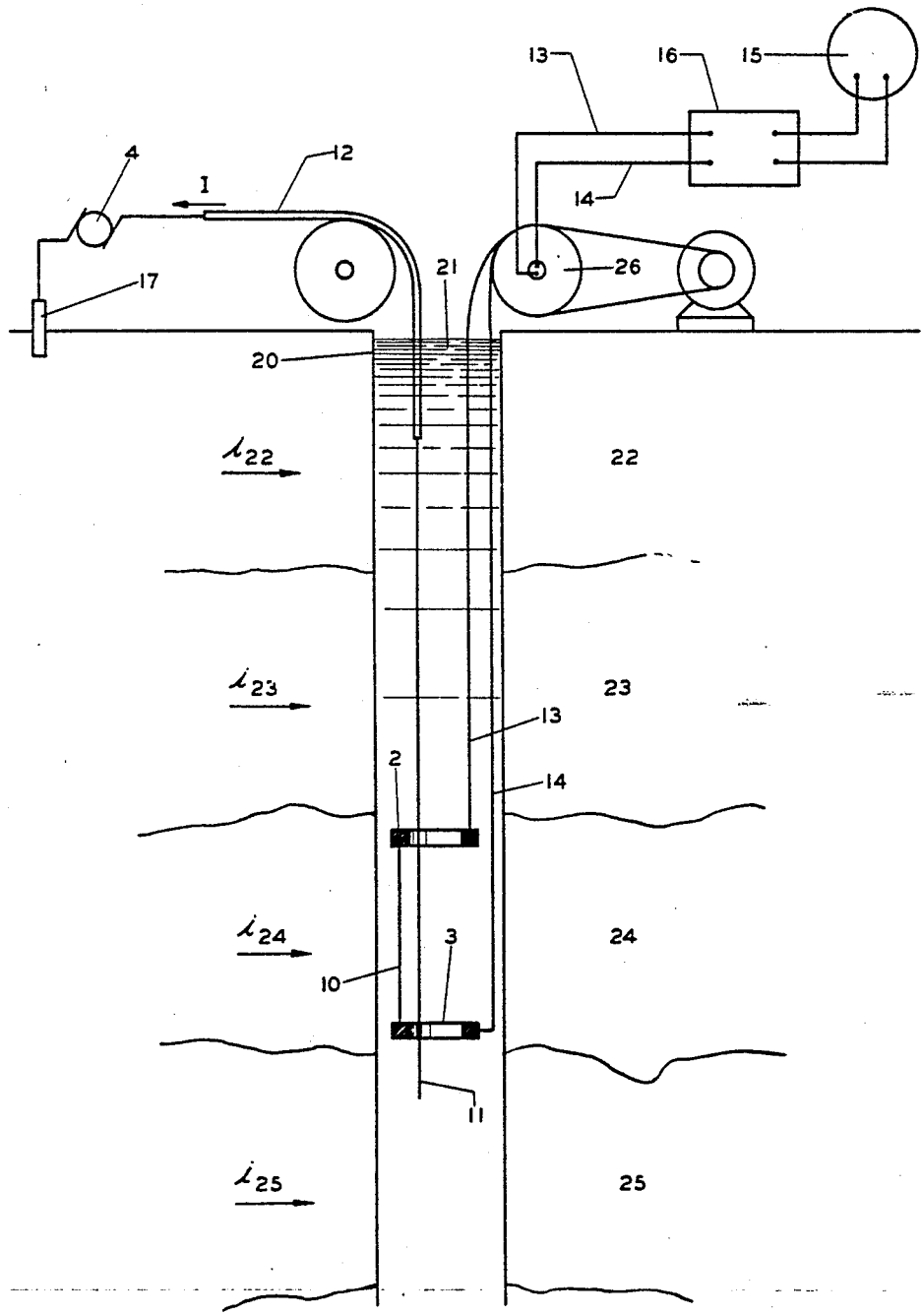
Figure 2 is a vertical sectional view through a bore hole showing a preferred form of this invention in operative position.

Figure 2 illustrates how this principle is applied to provide suitable apparatus for electrically surveying earth strata pierced by a bore hole. Earth strata 22, 23, 24, and 25 are pierced by a bore hole 20, which normally contains water or drilling fluid 21. A long electrode 11 which may be a bare wire is suspended in the bore hole by means of an insulated conductor 12. Conductor 12 is connected to one output terminal of an alternating current generator 4 which has its opposite output terminal connected to a grounded electrode 17. Grounded electrode 17 may be placed on the surface of the earth or in the bore hole.

The toroidal coils 2 and 3 in spaced relation to each other are suspended in the bore hole, by means of insulated conductors 13 and 14. These toroidal coils, wound with insulated wire and protected from the fluid of the bore hole by a suitable waterproof covering, are connected by an insulated conductor 10, as in Figure 1. Conductors 13 and 14 are connected to a recording meter 15 through an amplifier 16. A power reel 26 is provided to move toroids 2 and 3 along electrode 11.

Figure 3:
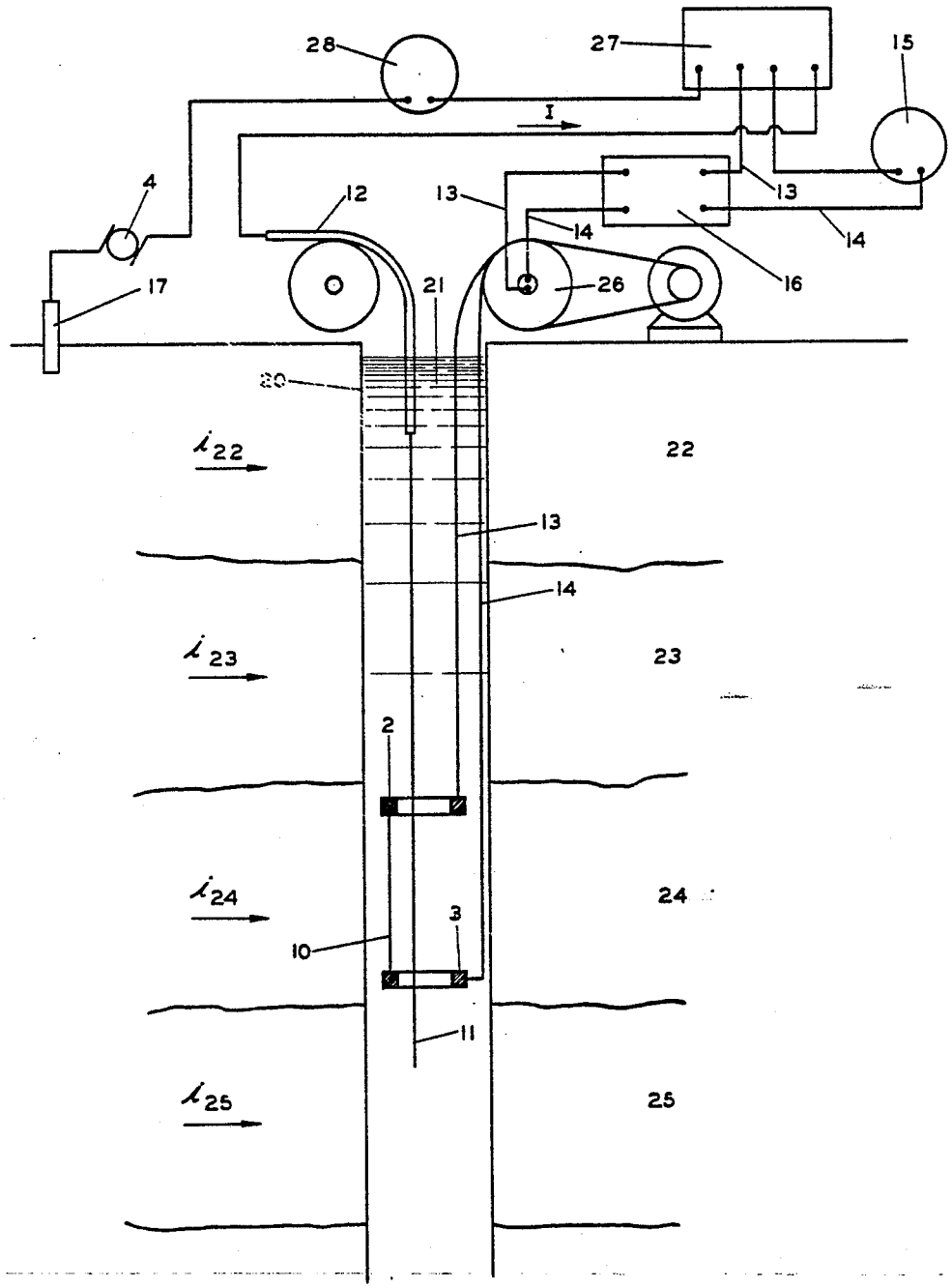
Figure 3 is a vertical sectional view through a bore hole illustrating a modification of this invention.

In operation, a potential is applied between electrodes 11 and 17 by the alternating current generator 4, causing current to flow from one electrode to the other through the intervening earth strata. Current will enter electrode 11 along its entire length, more entering where the current density is greatest in the formation, i. e., in that having high conductivity. In Figure 2 and Figure 3, the letter $i_{22}$ represents the current passing through stratum 22 into fluid 21 of the bore hole and into electrode 11. Similarly, $i_{23}$, $i_{24}$, and $i_{25}$ represent the currents flowing through strata 23, 24, and 25 into the fluid contained in the bore hole. Any other strata not shown in the drawings will likewise allow a certain amount of current to pass from them into this fluid. A current I will flow in conductor 11 where $I = i_{22} + i_{23} + i_{24} + i_{25} +$ etc., or I is equal to the summation of all the currents entering fluid 21.

Toroidal coils 2 and 3 are lowered into operating position in bore hole 20 to the region to be explored, where they are moved along electrode 11 by means of power reel 26. Current entering between the toroids will be indicated by the recording meter 15. By recording the current at various points along the bore hole, the extent and relative conductivity or resistivity of each stratum may be determined.

In Figure 3, the device is modified in such a way that the changes in phase between the current in the main circuit and the current entering that portion of electrode 11 between toroidal coils 2 and 3 may be measured. A meter 27 of the dynamometer type or an alternating current potentiometer is connected with conductor 12 and conductor 13 and one pole of the alternating current generator. A recording meter 28 is connected between alternating current source 4 and conductor 12 to measure the total current flowing between electrode 11 and generator 4. The dynamometer type meter has the field coil and moving coil terminals brought out separately. The deflection of the meter will then be proportional to the product of the currents in each coil multiplied by the cosine of phase angle between the two currents, so that if the currents are known the phase angle may be determined.

This system will obtain data which is useful also for approximating the extent to which the strata extend beyond the bore hole, and for locating non-conformities or deposits near the bore hole. For example, if one of the strata, say 24, is a poor conductor, it will tend to reduce the amount of current reaching the formation below it, but if 24 extends laterally only a short distance from the bore hole, then by moving electrode 17 away from the bore hole the currents can flow around 24 and enter the lower layers more readily. Electrode 17 may be moved radially or circumferentially with respect to the bore hole to determine extent or direction of various strata.

The use of different frequencies offers some control over the current distribution; at high frequencies, the current will tend to flow near the surface. In order to force the high frequency current down, the insulated conductor 12 may be lengthened to extend some distance into the bore hole. Electrode 11 may then be shortened to any convenient length, for example, one hundred feet, with the toroids fixedly positioned at some interval along its length. By moving the toroidal coils and the electrode simultaneously, the device will measure the deviations in current from the average over the one hundred feet of the strata being explored.

This device may be used for exploring a cased hole by preventing direct contact of electrode 11 with the casing. The number of toroidal coils used is optional, depending upon the data desired.

Various changes may be made without departing from the spirit of the invention, as set forth in the claims.

I claim:

1. Apparatus for electrically logging a bore hole comprising a source of electrical potential, an elongated electrode connected to one side of the source and extending into the bore hole, a pair of coils adjacent one another and in flux linkage relation with the elongated electrode, a grounded electrode connected to the other side of the source, means for measuring the total current in the elongated electrode, and means for measuring current in the coils.

2. A method of electrically logging a bore hole comprising suspending an elongated electrode in the bore hole to be logged, grounding a second electrode, establishing an electrical potential between the two electrodes and measuring at points along the bore hole the ratio of the magnitudes and the phase difference between the current entering a selected section of the elongated electrode and the total current entering the elongated electrode.

RAYMOND G. PIETY.